US012409607B2

(12) United States Patent
Bromberg

(10) Patent No.: US 12,409,607 B2
(45) Date of Patent: Sep. 9, 2025

(54) GAS CONTROL SYSTEMS FOR PURGING A PRINTHEAD MANUFACTURING APPARATUS

(71) Applicant: General Electric Company, Schenectady, NY (US)

(72) Inventor: Vadim Bromberg, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 346 days.

(21) Appl. No.: 17/901,334

(22) Filed: Sep. 1, 2022

(65) Prior Publication Data

US 2024/0075688 A1    Mar. 7, 2024

(51) Int. Cl.
| | | |
|---|---|---|
| *B29C 64/35* | (2017.01) | |
| *B08B 9/032* | (2006.01) | |
| *B08B 9/035* | (2006.01) | |
| *B29C 64/165* | (2017.01) | |
| *B29C 64/209* | (2017.01) | |
| *B33Y 30/00* | (2015.01) | |
| *B33Y 40/00* | (2020.01) | |

(52) U.S. Cl.
CPC ............ *B29C 64/35* (2017.08); *B08B 9/0325* (2013.01); *B08B 9/035* (2013.01); *B29C 64/209* (2017.08); *B33Y 30/00* (2014.12); *B33Y 40/00* (2014.12); *B29C 64/165* (2017.08)

(58) Field of Classification Search
None
See application file for complete search history.

(56) References Cited

U.S. PATENT DOCUMENTS

| | | |
|---|---|---|
| 7,850,290 B2 | 12/2010 | Nitta et al. |
| 8,017,055 B2 | 9/2011 | Davidson et al. |
| 10,828,824 B2 | 11/2020 | Sheinman |
| 2016/0339713 A1 | 11/2016 | Nishiyama et al. |
| 2021/0331396 A1 | 10/2021 | Vallverdu Verge et al. |

FOREIGN PATENT DOCUMENTS

| | | |
|---|---|---|
| CN | 209955515 U | 12/2018 |
| DE | 102019007952 A1 | 11/2019 |
| JP | 2011161844 A | 8/2011 |

(Continued)

OTHER PUBLICATIONS

Japanese Patent Office Action for Application No. 2023-141128 dated Jun. 8, 2024 (17 pages with translation).

(Continued)

*Primary Examiner* — Natasha N Campbell
(74) *Attorney, Agent, or Firm* — Dinsmore & Shohl LLP

(57) ABSTRACT

A gas control system including a positive pressure vessel, a negative pressure vessel, a first pressure control valve configured to control a flow of gas to and from a first manifold of a printhead assembly, and a second pressure control valve configured to control a flow of gas to and from a second manifold of the printhead assembly. During a normal positive pressure mode, gas flows from the positive pressure vessel to the first manifold and the second manifold through a respective one of the first pressure control valve and the second pressure control valve. During a positive pressure purge mode, gas from the positive pressure vessel bypasses the first pressure control valve and the second pressure control valve to flow to the first manifold and the second manifold.

20 Claims, 11 Drawing Sheets

(56) References Cited

FOREIGN PATENT DOCUMENTS

| | | |
|---|---|---|
| JP | 2016083807 A | 5/2016 |
| JP | 2023546833 A | 11/2023 |
| WO | 2014154641 A1 | 3/2013 |
| WO | 2019221702 A1 | 5/2018 |
| WO | 2020237123 A2 | 5/2019 |
| WO | 2020237165 A2 | 5/2019 |
| WO | 2022086867 A1 | 4/2022 |

OTHER PUBLICATIONS

Extended European Search Report for Application No. 23190919.3 dated Feb. 1, 2024 (11 pages).

GAS CONTROL SYSTEMS FOR PURGING A PRINTHEAD MANUFACTURING APPARATUS

TECHNICAL FIELD

The present specification generally relates to printing assemblies and, more specifically, to a control system of a printhead of a manufacturing apparatus and methods for using the same.

BACKGROUND

Printing assemblies may be utilized to "build" an object from build material, such as three-dimensional objects or parts, in a layer-wise manner. Early iterations of printing assemblies were used for prototyping three-dimensional parts. However, as printing assembly technology has improved, there is an increased interest in utilizing printing assemblies for large-scale commercial production of parts.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Generally, printing assemblies utilized in various contexts, including, for example, manufacturing applications, jet printing applications, and other printing types include parallel issues to those described above. For example, manufacturing apparatuses generally include printing assemblies, also referred to as printhead devices, which deposit materials through an array of jet nozzles during a manufacturing process. These printhead devices typically utilize a manifold having dual containers for inlet and outlet flow control to individual print heads. However, these nozzles may become clogged with binder such that a purging operation is required to alleviate the clog. Electric pump-based pressure control systems may be utilized to purge the printhead nozzles. However, such electric pump-based systems are not well suited to work with binders in an inert gas environment. Specifically, electric pump-based systems cannot readily and safely be used with flammable materials, electric pump-based systems are generally slow to increase and decrease both pressure and flow. Additionally, electric pump-based systems are more prone to electro-mechanical component failure.

Accordingly, a need exists for alternative printing assemblies and components thereof for controlling a pressure directed to a printhead so that clogs within a nozzle of the printhead may be addressed.

Figure 1:
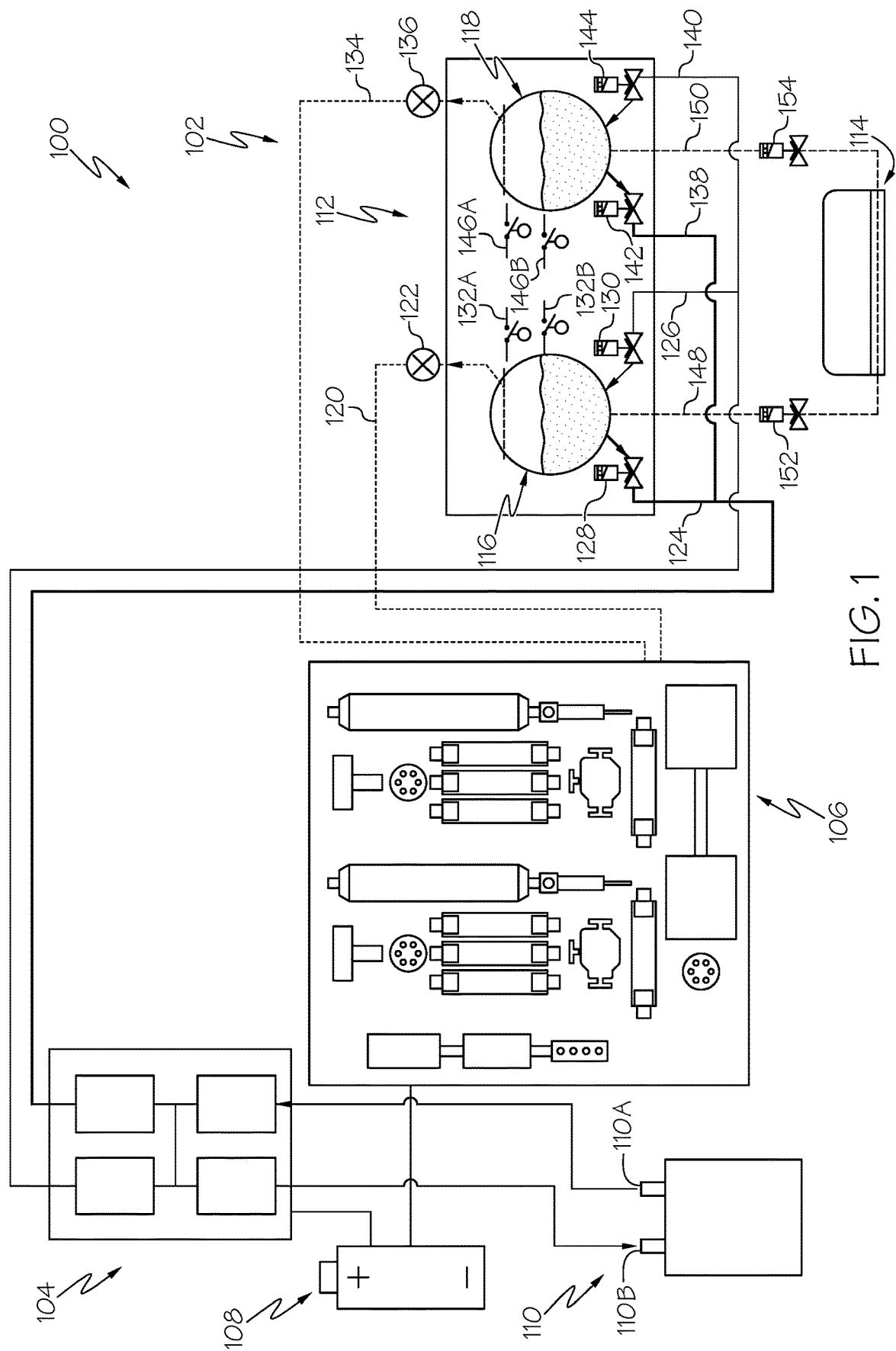
FIG. 1 schematically depicts a manufacturing apparatus including a gas control system and a printhead assembly, according to one or more embodiments shown and described herein.

Reference will now be made in detail to embodiments of manufacturing apparatuses, and components thereof, examples of which are illustrated in the accompanying drawings. Whenever possible, the same reference numerals will be used throughout the drawings to refer to the same or like parts. Embodiments of a manufacturing apparatus, an example of which is schematically depicted in FIG. 1, include a printhead assembly including a first manifold, a second manifold, and one or more printheads, a binder control system, a gas control system, a power source, and a binder tank. The power source provides power to the binder control system, the gas control system, and the printhead assembly. The binder control system controls the flow of binder from the binder tank to each of the first manifold and the second manifold. The gas control system controls a flow of gas from an external gas supply to each of the first manifold and the second manifold, as well as modulates the flow of gas during binder flow operations. During a purging operation, gas may be rapidly circulated between the gas control system and the manifolds to purge a clogged nozzle of the one or more printheads. Various embodiments of printing assemblies for manufacturing apparatuses, manufacturing apparatuses comprising the printing assemblies, and methods for using the same are described in further detail herein with specific reference to the appended drawings. It should be understood that the embodiments of the manufacturing apparatuses shown and described herein may be configured and operable to build three-dimensional and/or non-three dimensional objects or parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

Embodiments described herein are directed to manufacturing apparatuses (e.g., additive manufacturing apparatuses) and components for manufacturing apparatuses, specifically printing assemblies for depositing binder and other jettable materials. Various embodiments described herein may be implemented to perform de-clogging operations of printing assemblies. It is understood that technology developed and described herein relates to manufacturing, however, aspects of the technology may have applications in related industries such as 2-D printing or the like.

Referring now to FIG. 1, a manufacturing apparatus 100 is illustrated according to one or more embodiments described herein. The manufacturing apparatus 100 may generally include a printhead assembly 102, a binder control system 104 for controlling a flow of binder to the printhead assembly 102, a gas control system 106 for controlling a flow of gas to the printhead assembly 102, a power source 108 for providing power to the binder control system 104, the gas control system 106, and the printhead assembly 102, and a binder tank 110 for storing a supply of binder. The printhead assembly 102 includes a manifold assembly 112 and printhead(s) 114. Although only one printhead 114 is illustrated in FIG. 1, it should be appreciated that the printhead assembly 102 may include any number of printheads including a plurality of printheads 114.

With respect to the manifold assembly 112, the manifold assembly 112 includes an inlet or first manifold 116 and an outlet or second manifold 118. In embodiments, the first manifold 116 stores binder prior to being delivered to the printhead(s) 114. The second manifold 118 stores unused binder from the printhead(s) 114. In some embodiments, the second manifold 118 receives binder directly from the first manifold 116 as opposed to unused binder that flowing through the printhead(s) 114. In embodiments, the binder is a solvent-based binder.

The first manifold 116 includes a first gas inlet line 120 placing the first manifold 116 in fluid communication with the gas control system 106. The first gas inlet line 120 directs gas from the gas control system 106 to the first manifold 116 and includes a first gas gauge 122 for detecting a pressure of gas within the first manifold 116.

The first manifold 116 further also includes a first binder inlet line 124 and a first binder outlet line 126 placing the first manifold 116 in fluid communication with the binder control system 104. The first binder inlet line 124 directs binder from the binder control system 104, and thus the binder tank 110, to the first manifold 116. A first binder inlet valve 128 is provided in the first binder inlet line 124 for controlling a flow of binder to the first manifold 116. The first binder outlet line 126 allows binder to flow out of the first manifold 116. As such, binder is permitted to flow from an outlet 110A of the binder tank 110, through the binder control system 104, and into the first manifold 116 through the first binder inlet line 124. Similarly, binder is permitted to flow out of the first manifold 116 through the first binder outlet line 126, back through the binder control system 104, and return to an inlet 110B of the binder tank 110. A first binder outlet valve 130 is provided in the first binder outlet line 126 for controlling a flow of binder out of the first manifold 116.

The first manifold 116 further includes a first upper float 132A and a first lower float 132B. The first upper float 132A and the first lower float 132B are configured to detect a level of binder within the first manifold 116. When the first upper float 132A detects the level of binder exceeds a predetermined upper threshold, the gas control system 106 is operated, as discussed herein, to increase the pressure of gas within the first manifold 116. Alternatively, when the first lower float 132B detects the level of binder falls below a predetermined lower threshold, the gas control system 106 is operated to decrease the pressure of gas within the first manifold 116.

Similarly, the second manifold 118 includes a second gas inlet line 134 placing the second manifold 118 in fluid communication with the gas control system 106. The second gas inlet line 134 directs gas from the gas control system 106 to the second manifold 118 and includes a second gas gauge 136 for detecting a pressure of gas within the second manifold 118.

The second manifold 118 further also includes a second binder inlet line 138 and a second binder outlet line 140 placing the second manifold 118 in fluid communication with the binder control system 104. The second binder inlet line 138 directs binder from the binder control system 104, and thus the binder tank 110, to the second manifold 118. A second binder inlet valve 142 is provided in the second binder inlet line 138 for controlling a flow of binder to the second manifold 118. The second binder outlet line 140 allows binder to flow out of the second manifold 118. As such, binder is permitted to flow from the outlet 110A of the binder tank 110, through the binder control system 104, and into the second manifold 118 through the second binder inlet line 138. Similarly, binder is permitted to flow out of the second manifold 118 through the second binder outlet line 140, back through the binder control system 104, and return to the inlet 110B of the binder tank 110. A second binder outlet valve 144 is provided in the second binder outlet line 140 for controlling a flow of binder out of the second manifold 118. In embodiments, the second binder inlet line 138 merges with the first binder inlet line 124, and the second binder outlet line 140 merges with the first binder outlet line 126.

The second manifold 118 further includes a second upper float 146A and a second lower float 146B. The second upper float 146A and the second lower float 146B are configured to detect a level of binder within the second manifold 118. When the second upper float 146A detects the level of binder exceeds a predetermined upper threshold, the gas control system 106 is operated, as discussed herein, to increase the pressure of gas within the second manifold 118. Alternatively, when the second lower float 146B detects the level of binder falls below a predetermined lower threshold, the gas control system 106 is operated to decrease the pressure of gas within the second manifold 118. Although not shown, it should be appreciated that a bypass line may be provided for placing the first manifold 116 and the second manifold 118 in direct fluid communication with one another. The bypass line may permit binder to flow from the first manifold 116 to the second manifold 118 without having to flow through the printhead(s) 114. This may be necessary to adjust a level of binder within either the first manifold 116 or the second manifold 118 without requiring additional binder to be pumped specifically to the first manifold 116 or the second manifold 118 from the binder tank 110.

The first manifold 116 is in fluid communication with the printhead(s) 114 via a first manifold supply line 148 and the second manifold 118 is in fluid communication with the printhead(s) 114 via a second manifold supply line 150. A first manifold supply line valve 152 is provided in the first manifold supply line 148 for controlling a flow of binder between the printhead(s) 114 and the first manifold 116. A second manifold supply line valve 154 is provided in the second manifold supply line 150 for controlling a flow of binder between the printhead(s) 114 and the second manifold 118. In embodiments, binder flows from the first manifold 116 to the printhead(s) 114 via the first manifold supply line 148 and the binder is dispensed from one or more nozzles of the printhead(s) 114. Thereafter, unused binder flows from the printhead(s) 114 to the second manifold 118 via the second manifold supply line 150.

The flow of binder through the printhead(s) 114 from the first manifold 116 and to the second manifold 118 is due in part to the pressure within the first manifold 116 being greater than the pressure within the second manifold 118. For example, the pressure in the first manifold 116 may be between −150 mmH2O and −250 mmH2O, and the pressure in the second manifold 118 may be between −200 mmH2O and −300 mmH2O. More particular, for example, the pressure in the first manifold 116 may be between −175 mmH2O and −225 mmH2O, and the pressure in the second manifold 118 may be between −225 mmH2O and −275 mmH2O. However, the nozzles of the printhead(s) 114 may become clogged such that the printhead(s) 114 may need to undergo a purging operation to de-clog the nozzles. As described herein, the gas control system 106 may be operated to perform a purging operation such that the pressure within the first manifold 116 and the second manifold 118 may be repeatedly increased and decreased to de-clog the binder within the nozzles of the printhead(s) 114. It should be appreciated that the pressures provided herein are gauge pressures, i.e., relative to the environment surrounding the printhead assembly 102.

Figure 2:
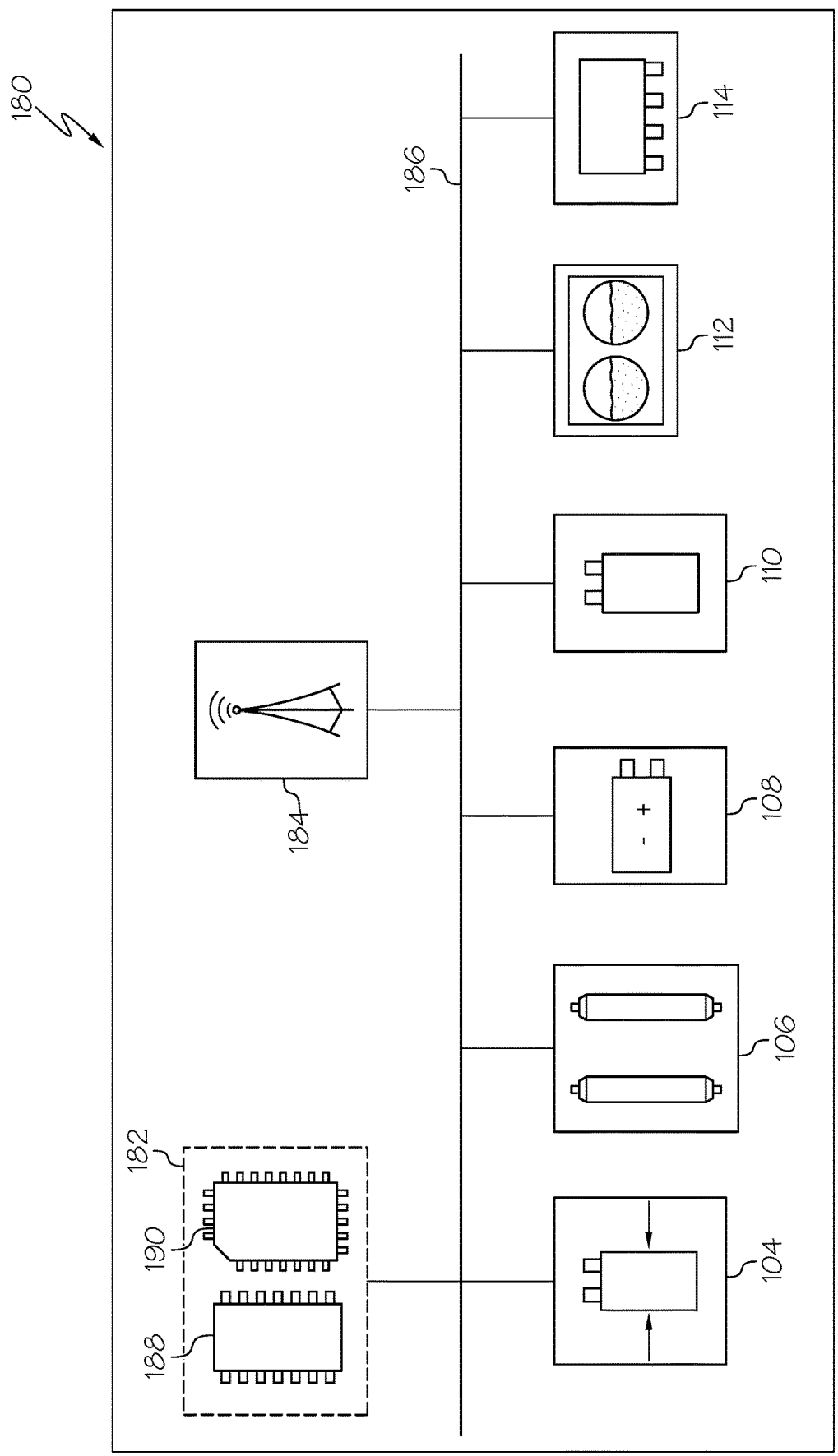
FIG. 2 schematically depicts a manufacturing system for operating the manufacturing apparatus of FIG. 1, according to one or more embodiments shown and described herein.

Referring now to FIG. 2, a manufacturing system 180 may be provided for operating the binder control system 104, the gas control system 106, the power source 108, the binder tank 110, and the printhead assembly 102 including the manifold assembly 112 and the printhead(s) 114, as well as the individual components thereof, as discussed in more detail herein. The manufacturing system 180 may comprise an electronic control unit 182, network interface hardware 184, and a communication path 186 communicatively coupled these components.

The electronic control unit 182 comprises a processor 188 and a non-transitory electronic memory 190 to which various components are communicatively coupled. In some embodiments, the processor 188 and the non-transitory electronic memory 190 and/or the other components are included within a single device. In other embodiments, the processor 188 and the non-transitory electronic memory 190 and/or the other components may be distributed among multiple devices that are communicatively coupled. The electronic control unit 182 includes non-transitory electronic memory 190 that stores a set of machine-readable instructions. The processor 188 executes the machine-readable instructions stored in the non-transitory electronic memory 190. The non-transitory electronic memory 190 may comprise RAM, ROM, flash memories, hard drives, or any device capable of storing machine-readable instructions such that the machine-readable instructions can be accessed by the processor 188. Accordingly, the manufacturing system 180 described herein may be implemented in any conventional computer programming language, as pre-programmed hardware elements, or as a combination of hardware and software components. The non-transitory electronic memory 190 may be implemented as one memory module or a plurality of memory modules.

In some embodiments, the non-transitory electronic memory 190 includes instructions for executing the functions of the manufacturing system 180. The instructions may include instructions for operating the binder control system 104, the gas control system 106, the power source 108, the binder tank 110, and the printhead assembly 102 including the manifold assembly 112 and the printhead(s) 114, as well as the individual components thereof.

The processor 188 may be any device capable of executing machine-readable instructions. For example, the processor 188 may be an integrated circuit, a microchip, a computer, or any other computing device. The non-transitory electronic memory 190 and the processor 188 are coupled to the communication path 186 that provides signal interconnectivity between various components and/or modules of the manufacturing system 180. Accordingly, the communication path 186 may communicatively couple any number of processors with one another, and allow the modules coupled to the communication path 186 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 2, the communication path 186 communicatively couples the processor 188 and the non-transitory electronic memory 190 of the electronic control unit 182 with a plurality of other components of the manufacturing system 180. For example, the manufacturing system 180 depicted in FIG. 2 includes the processor 188 and the non-transitory electronic memory 190 communicatively coupled with the binder control system 104, the gas control system 106, the power source 108, the binder tank 110, the manifold assembly 112, and the printhead(s) 114.

In some embodiments, the manufacturing system 180 includes network interface hardware 184 for communicatively coupling the manufacturing system 180 to a computing device via a network. The computing device may include, without limitation, a smartphone, a tablet, a personal media player, or any other electric device that includes wireless communication functionality. It is to be appreciated that, when provided, the computing device may serve to provide user commands to the electronic control unit 182 remotely by wirelessly communicating with the electronic control unit 182 via a network. In embodiments, the manufacturing system 180 may include an operating device allowing for a user to control operation of the binder control system 104, the gas control system 106, the power source 108, the binder tank 110, the manifold assembly 112, and the printhead(s) 114. In some embodiments, the operating device may be a switch, toggle, button, or any combination of controls to provide user operation. The operating device is coupled to the communication path 186 such that the communication path 186 communicatively couples the operating device to other modules of the manufacturing system 180.

Figure 3:
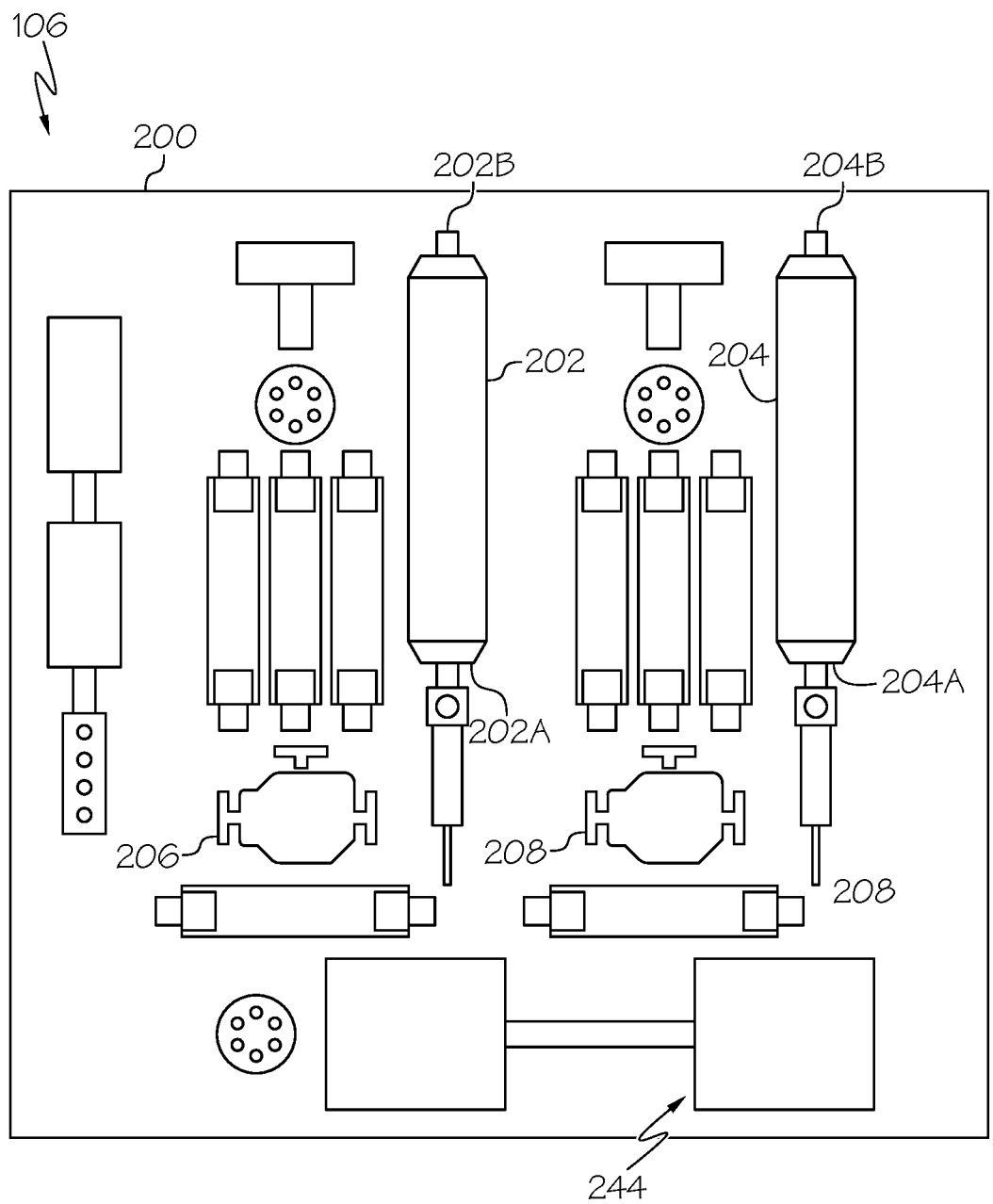
FIG. 3 schematically depicts a perspective view of the gas control system of FIG. 1, according to one or more embodiments shown and described herein.
Figure 4:
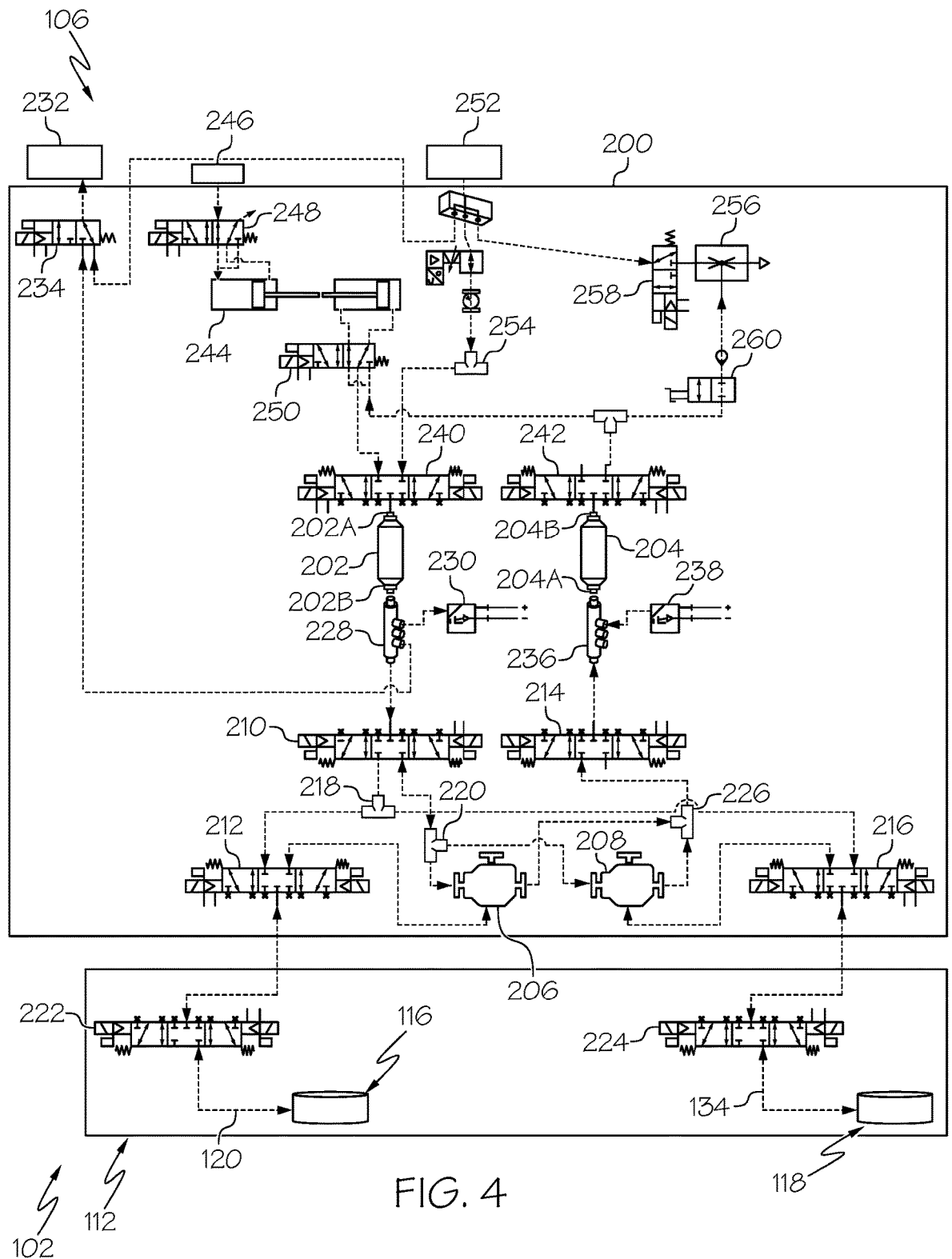
FIG. 4 schematically depicts components of the gas control system of FIG. 3 and a printhead of the printhead apparatus of FIG. 1, according to one or more embodiments shown and described herein.

Referring now to FIGS. 3 and 4, the gas control system 106 includes a panel 200 and a plurality of various components mounted to the panel 200 in any suitable manner such as by utilizing brackets and other fasteners. The components generally include a positive pressure vessel 202 for providing a gas, such as an inert gas, to each of the first manifold 116 and second manifold 118 of the manifold assembly 112, a negative pressure vessel 204 for drawings a gas, such as an inert gas, out of each of the first manifold 116 and the second manifold 118 of the manifold assembly 112, a first pressure control valve 206 for controlling the pressure within the first manifold 116, and a second pressure control valve 208 for controlling the pressure within the second manifold 118. It will be understood that the positive pressure vessel 202 may be any suitable vessel configured to define a plenum chamber containing a gas at positive pressure. It will be understood that the negative pressure vessel 204 may be any suitable vessel configured to define a vacuum chamber containing a gas at negative pressure.

The first pressure control valve 206 and the second pressure control valve 208 control the amount of gas allowed to flow into and out of, or to and from, the first manifold 116 and the second manifold 118, respectively, by controlling the rate of gas flowing through the first pressure control valve 206 and the second pressure control valve 208. In embodiments, the first pressure control valve 206 and the second pressure control valve 208 are proportional valves. Prior to performing a purging operation of the manifold assembly 112 or during normal operation of the gas control system 106, the positive pressure vessel 202 is positively pressurized, e.g., above 0 psi, and the negative pressure vessel 204 is negatively pressurized to provide a vacuum, i.e., below 0 psi. More particularly, for example, the positive pressure vessel 202 may be positively pressurized to a pressure greater than or equal to 10 psi and less than or equal to 20 psi, and the negative pressure vessel 204 may be negatively pressurized to a pressure greater than or equal to −10 psi and less than or equal to −15 psi relative to atmosphere. However, after a purging operation when the positive pressure vessel 202 releases gas to the first manifold 116 and the second manifold 118, and the negative pressure vessel 204 recovers the gas, the positive pressure vessel 202 and the negative pressure vessel 204 may become depressurized, i.e., the pressure within the positive pressure vessel 202 and the negative pressure vessel 204 is 0 psi. Thus, as discussed in more detail herein, the positive pressure vessel 202 and the negative pressure vessel 204 must be recalibrated from a depressurized state to a calibrated state to perform a subsequent purging operation or continue performing a normal operation.

In embodiments, the gas control system 106 further includes a first positive pressure valve 210, a control side first manifold valve 212, a first negative pressure valve 214, and a control side second manifold valve 216. The first positive pressure valve 210 is positionable between a first open state, a second open state, and a closed state. When the first positive pressure valve 210 is in the closed state, gas may be prevented from flowing through the first positive pressure valve 210 from an outlet 202B of the positive pressure vessel 202.

When the first positive pressure valve 210 is in the first open state, gas from the positive pressure vessel 202 is permitted to flow through the first positive pressure valve 210 and distributed to both the control side first manifold valve 212 and the control side second manifold valve 216 via a first positive pressure distributor 218. The first positive pressure distributor 218 receives gas from the positive pressure vessel 202 via the first positive pressure valve 210 and redirects the gas to the control side first manifold valve 212 and the control side second manifold valve 216. In embodiments, the first positive pressure distributor 218 may include a controllable valve feature to control the amount of gas flowing to either one or both of the control side first manifold valve 212 and the control side second manifold valve 216. In other embodiments, the first positive pressure distributor 218 may be fixed such that gas is evenly distributed to the control side first manifold valve 212 and the control side second manifold valve 216.

When the first positive pressure valve 210 is in the second open state, the gas from the positive pressure vessel 202 is permitted to flow through the first positive pressure valve 210 and distributed to both the first pressure control valve 206 and the second pressure control valve 208 via a second positive pressure distributor 220. The second positive pressure distributor 220 receives gas from the positive pressure vessel 202 via the first positive pressure valve 210 and redirects the gas to the first pressure control valve 206 and the second pressure control valve 208. Similar to the first positive pressure distributor 218, in embodiments, the second positive pressure distributor 220 may include a controllable valve feature to control the amount of gas to either one or both of the first pressure control valve 206 and the second pressure control valve 208. In other embodiments, the second positive pressure distributor 220 may be fixed such that gas is evenly distributed to the first pressure control valve 206 and the second pressure control valve 208. As discussed in more detail herein, the first pressure control valve 206 and the second pressure control valve 208 control the amount of gas being directed to the first manifold 116 and the second manifold 118 from the positive pressure vessel 202.

The control side first manifold valve 212 is positionable between a first open state, a second open state, and a closed state. When the control side first manifold valve 212 is in the closed state, the gas, either provided to the first manifold 116 by the positive pressure vessel 202 or drawn from the first manifold 116 by the negative pressure vessel 204, is prohibited from flowing through the control side first manifold valve 212. When the control side first manifold valve 212 is in the first open state, the gas, either provided to the first manifold 116 by the positive pressure vessel 202 or drawn from the first manifold 116 by the negative pressure vessel 204, is permitted to flow through the control side first manifold valve 212. More particularly, when the control side first manifold valve 212 is in the first open state, gas provided by the first positive pressure valve 210 is permitted to flow through the control side first manifold valve 212 from the first positive pressure valve 210 to a printhead side first manifold valve 222. When the control side first manifold valve 212 is in the second open state, gas is directed through the control side first manifold valve 212 and to the first pressure control valve 206. However, when the printhead side first manifold valve 222 is positioned in a closed state, gas is prohibited from flowing through the printhead side first manifold valve 222 to or from the first manifold 116.

Similarly, the control side second manifold valve 216 is positionable between a first open state, a second open state, and a closed state. When the control side second manifold valve 216 is in the closed state, the gas, either provided to the second manifold 118 by the positive pressure vessel 202 or drawn from the second manifold 118 by the negative pressure vessel 204, is prohibited from flowing through the control side second manifold valve 216. When the control side second manifold valve 216 is in the first open state, the gas, either provided to the second manifold 118 by the positive pressure vessel 202 or drawn from the second manifold 118 by the negative pressure vessel 204, is permitted to flow through the control side second manifold valve 216. More particularly, when the control side second manifold valve 216 is in the first open state, gas provided by the first positive pressure valve 210 is permitted to flow through the control side second manifold valve 216 from the first positive pressure valve 210 to a printhead side second manifold valve 224. When the control side second manifold valve 216 is in the second open state, gas is directed through the control side second manifold valve 216 and to the second pressure control valve 208. However, when the printhead side second manifold valve 224 is positioned in a closed state, gas is prohibited from flowing through the printhead side second manifold valve 224 to or from the second manifold 118.

The first negative pressure valve 214 is also positionable between an open state and a closed state. When the first negative pressure valve 214 is in the closed state, gas may be prevented from flowing through the first negative pressure valve 214 to an inlet 204A of the negative pressure vessel 204.

When the first negative pressure valve 214 is in the open state, gas, i.e., a secondary flow of gas, is permitted to flow through the first negative pressure valve 214, such as from a negative pressure distributor 226. The negative pressure distributor 226 receives gas flowing from each of the first pressure control valve 206 and the second pressure control valve 208, which is received from the first manifold 116 and the second manifold 118, respectively. As discussed in more detail herein, the first pressure control valve 206 and the second pressure control valve 208 control the amount of gas being drawn out of the first manifold 116 and the second manifold 118, and directed to the negative pressure vessel 204 during a vacuum recovery mode or a normal operating mode.

In embodiments, the gas control system 106 includes a positive pressure meter 228 through which gas flows from the positive pressure vessel 202 to the first positive pressure valve 210. A positive pressure sensor 230 is in fluid communication with the positive pressure meter 228 to detect a rate of flow of gas through the positive pressure meter 228. In embodiments, during a power failure or complete system shutdown, the positive pressure meter 228 may be operated to direct all gas from the positive pressure vessel 202 to an external gas receptacle 232 so that the gas control system 106 may be depressurized. An external valve 234 may be provided for permitting the flow of gas from the positive pressure meter 228 to the external gas receptacle 232.

Similarly, in embodiments, the gas control system 106 also includes a negative pressure meter 236 through which gas flows from first negative pressure valve 214 to the negative pressure vessel 204. A negative pressure sensor 238 is in fluid communication with the negative pressure meter 236 to detect a rate of flow of gas through the negative pressure meter 236.

The components described above control the flow of gas between each of the positive pressure vessel 202 and the negative pressure vessel 204 and the manifolds. However, as discussed herein, the positive pressure vessel 202 and the negative pressure vessel 204 will need to be recalibrated after a purging operation from a depressurized state to a calibrated state such that the positive pressure vessel 202 contains a positive pressure of gas, above 0 psi, and the negative pressure vessel 204 is depressurized to have a negative pressure/vacuum, i.e., below 0 psi. As such, the following components described herein are utilized for calibrating both the positive pressure vessel 202 and the negative pressure vessel 204 from the depressurized state to the calibrated state.

In embodiments, the gas control system 106 further includes a second positive pressure valve 240 for permitting gas to flow into the positive pressure vessel 202, such as during a cleaning operation or when calibrating the positive pressure vessel 202 back into the calibrated state. The second positive pressure valve 240 is positionable between an open state and a closed state. When the second positive pressure valve 240 is in the open state, gas is permitted to flow into the inlet 202A of the positive pressure vessel 202. When the second positive pressure valve 240 is in the closed state, gas is prohibited from flowing into the inlet 202A of the positive pressure vessel 202. Similarly, the gas control system 106 further includes a second negative pressure valve 242 for permitting gas to flow both into an outlet 204B of the negative pressure vessel 204, such as during a cleaning operation, and out of the outlet 204B of the negative pressure vessel 204, such as to create a vacuum within the negative pressure vessel 204 and calibrate the negative pressure vessel 204 back into the calibrated state. The second negative pressure valve 242 is positionable between an open state and a closed state. When the second negative pressure valve 242 is in the open state, gas is permitted to flow through the second negative pressure valve 242, such as to or from the outlet 204B of the negative pressure vessel 204. When the second negative pressure valve 242 is in the closed state, gas is prohibited from flowing to or from the outlet 204B of the negative pressure vessel 204.

After a purging operation, discussed in more detail herein, when the positive pressure vessel 202 and the negative pressure vessel 204 are both in the depressurized state, gas may be redistributed from the negative pressure vessel 204 to the positive pressure vessel 202 to calibrate the positive pressure vessel 202 and the negative pressure vessel 204 into respective calibrated states such that the positive pressure vessel 202 is positively pressurized and the negative pressure vessel 204 is negatively pressurized. In embodiments, as discussed in more detail herein, the gas control system 106 may include a dual piston assembly 244, a compressed air tank 246, a first piston valve 248, and a second piston valve 250. The dual piston assembly 244 is operated to draw gas out of the outlet 204B of the negative pressure vessel 204 and direct the gas into the inlet 202A of the positive pressure vessel 202. More particularly, in embodiments, the dual piston assembly 244 includes a piston and operates by repeatedly alternating the piston between a first position and a second position to create a suction force drawing the gas from the compressed air tank 246 and directing the gas toward the positive pressure vessel 202. Although the dual piston assembly 244 is shown in the same position in FIGS. 6-11, it should be appreciated that when the dual piston assembly 244 is operated, the piston is repeatedly actuated. The dual piston assembly 244 may be operated to circulate gas between the positive pressure vessel 202 and the negative pressure vessel 204 to achieve a fully closed gas circuit. This reduces the degree of risk to an operator.

The first piston valve 248 may be positionable between an open state and a closed state. When the first piston valve 248 is in the open state, compressed air from the compressed air tank 246 may be delivered to the dual piston assembly 244 to actuate the dual piston assembly 244. When the first piston valve 248 is in the closed state, compressed air may not be delivered to the dual piston assembly 244. When the second piston valve 250 is in the open state, gas is permitted to both enter the dual piston assembly 244 from the negative pressure vessel 204, so as to enter the dual piston assembly 244, and exit the dual piston assembly 244, so as to be delivered to the positive pressure vessel 202. When the second piston valve 250 is in the closed position, gas is prohibited from entering the dual piston assembly 244 from the negative pressure vessel 204 and gas is prohibited from being delivered to the positive pressure vessel 202 from the dual piston assembly 244.

In another embodiment, the gas control system 106 includes an external gas supply 252 for delivering gas to the positive pressure vessel 202 independent of gas being drawn out of the negative pressure vessel 204. The external gas supply 252 may be configured to deliver gas to both of the positive pressure vessel 202 and the negative pressure vessel 204, such as during the cleaning operation. In this embodiment, and discussed in more detail herein, the external gas supply 252 provides gas to the positive pressure vessel 202 and the negative pressure vessel 204 via an external gas supply distributor 254. The external gas supply distributor 254 receives gas from the external gas supply 252 and redirects the gas to both the positive pressure vessel 202 and the negative pressure vessel 204. In embodiments, the external gas supply distributor 254 may include a controllable valve feature to control the amount of gas flowing to either one or both of the positive pressure vessel 202 and the negative pressure vessel 204. In other embodiments, the external gas supply distributor 254 may be fixed such that gas is evenly distributed to the positive pressure vessel 202 and the negative pressure vessel 204.

In other embodiments, the gas control system 106 may include a Venturi device 256 configured to receive gas or other fluid from the external gas supply 252 and draw gas out of the negative pressure vessel 204 to create a negative pressure within the negative pressure vessel 204, thereby placing the negative pressure vessel 204 back into the calibrated state. The gas control system 106 may include a first Venturi valve 258 provided between the external gas supply 252 and the Venturi device 256, and positionable between an open and a closed position. When the first Venturi valve 258 is in the open position, fluid flow from the external gas supply 252 is permitted to flow into the Venturi device 256. When the first Venturi valve 258 is in the closed position, fluid flow from the external gas supply 252 is prohibited from entering the Venturi device 256. In embodiments, the gas control system 106 further includes a second Venturi valve 260 provided between the Venturi device 256 and the negative pressure vessel 204. The second Venturi valve 260 is configured to allow gas to flow in only one direction between the Venturi device 256 and the negative pressure vessel 204. Specifically, the second Venturi valve 260 permits gas to be drawn out of the negative pressure vessel 204 and provided to the Venturi device 256, but not flow back into the negative pressure vessel 204.

The gas control system 106 is operable between multiple modes such as, for example, a positive pressure purge mode during a purging operation, a negative pressure purge mode or vacuum recovery mode during a purging operation, a normal positive pressure mode during a normal operation, a normal negative pressure mode during a normal operation, a calibration mode, and a cleaning mode.

As described herein, the manufacturing system 180 includes an electronic control unit 182. It should be appreciated that the electronic control unit 182 is configured to operate the individual components of the gas control system 106. For example, the electronic control unit 182 is responsible for controlling at least the first positive pressure valve 210, the control side first manifold valve 212, the first negative pressure valve 214, the control side second manifold valve 216, the first pressure control valve 206, and the second pressure control valve 208 between the various operating positions and states.

Figure 5:
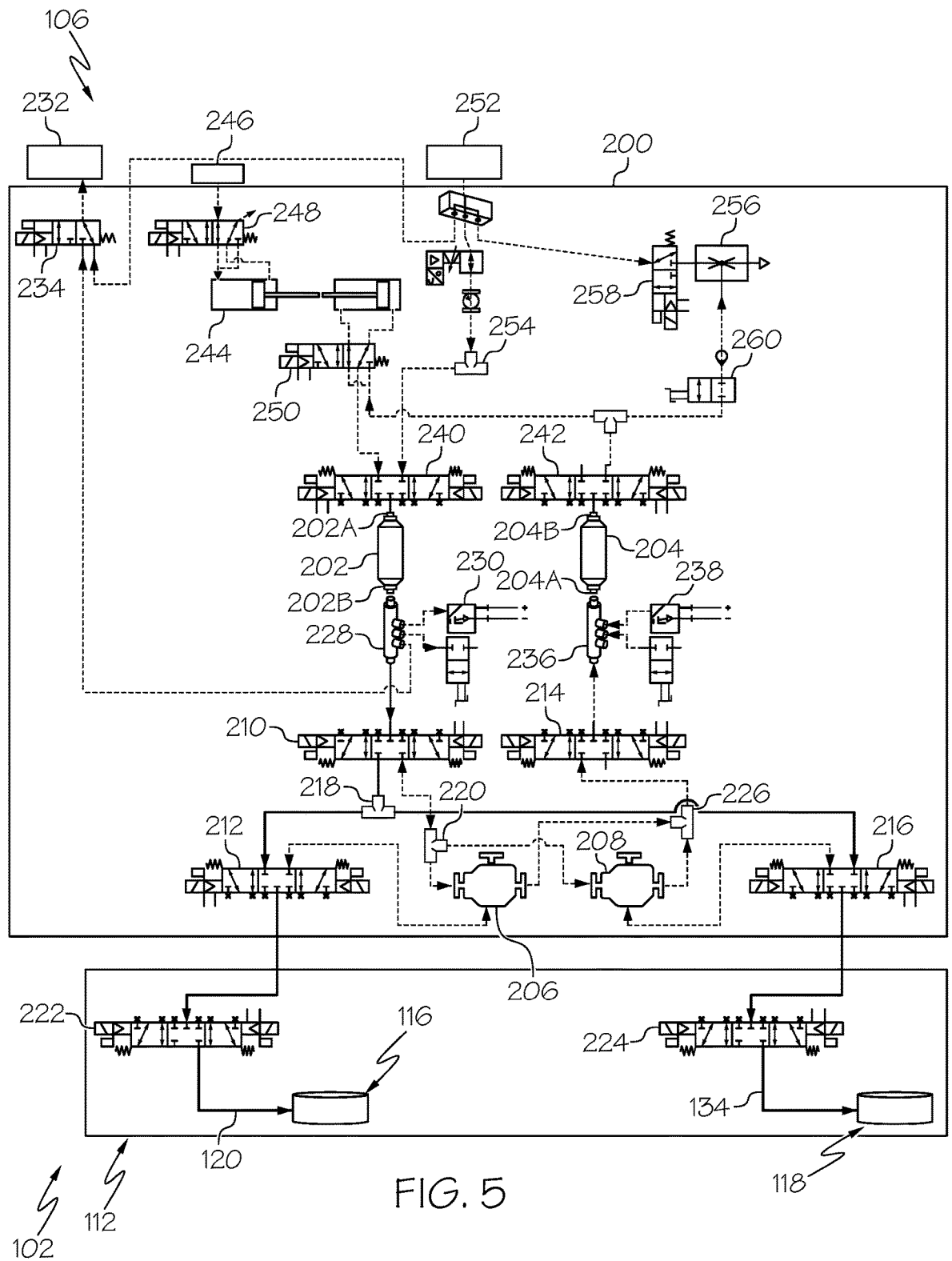
FIG. 5 schematically depicts a flow of gas through the gas control system of FIG. 3 during a positive pressure purge mode, according to one or more embodiments shown and described herein.

Referring now to FIG. 5, a flow of gas during the positive pressure purge mode of a purging operation is depicted in solid line. Specifically, when it is determined that the printhead(s) 114 of the printhead assembly 102 require purging, such as when a clog is detected within one or more nozzles of printhead(s) 114, the gas control system 106 performs the purging operation. The purging operation includes a positive pressure purge mode and a negative pressure purge mode, also referred to herein as a vacuum recovery mode. During the positive pressure purge mode of the purging operation, gas from the positive pressure vessel 202 is released into the first manifold 116 and the second manifold 118. More particularly, during the positive pressure purge mode, the first positive pressure valve 210 is positioned into the first open state in which gas is directed to both of the control side first manifold valve 212 and the control side second manifold valve 216 through the first positive pressure distributor 218. In the positive pressure purge mode, the control side first manifold valve 212 and the control side second manifold valve 216 are both positioned into the first open state such that gas is permitted to flow to the printhead side first manifold valve 222 and the printhead side second manifold valve 224. Thereafter, the printhead side first manifold valve 222 and the printhead side second manifold valve 224 are both positioned into the open state to permit the gas to flow into the first manifold 116 and the second manifold 118, respectively. By allowing gas to flow, unrestricted, from the positive pressure vessel 202 to both the first manifold 116 and the second manifold 118, the pressure within the first manifold 116 and the second manifold 118 is increased to push additional binder through to the printhead(s) 114. Additionally, the gas is permitted to bypass the first pressure control valve 206 and the second pressure control valve 208.

Figure 6:
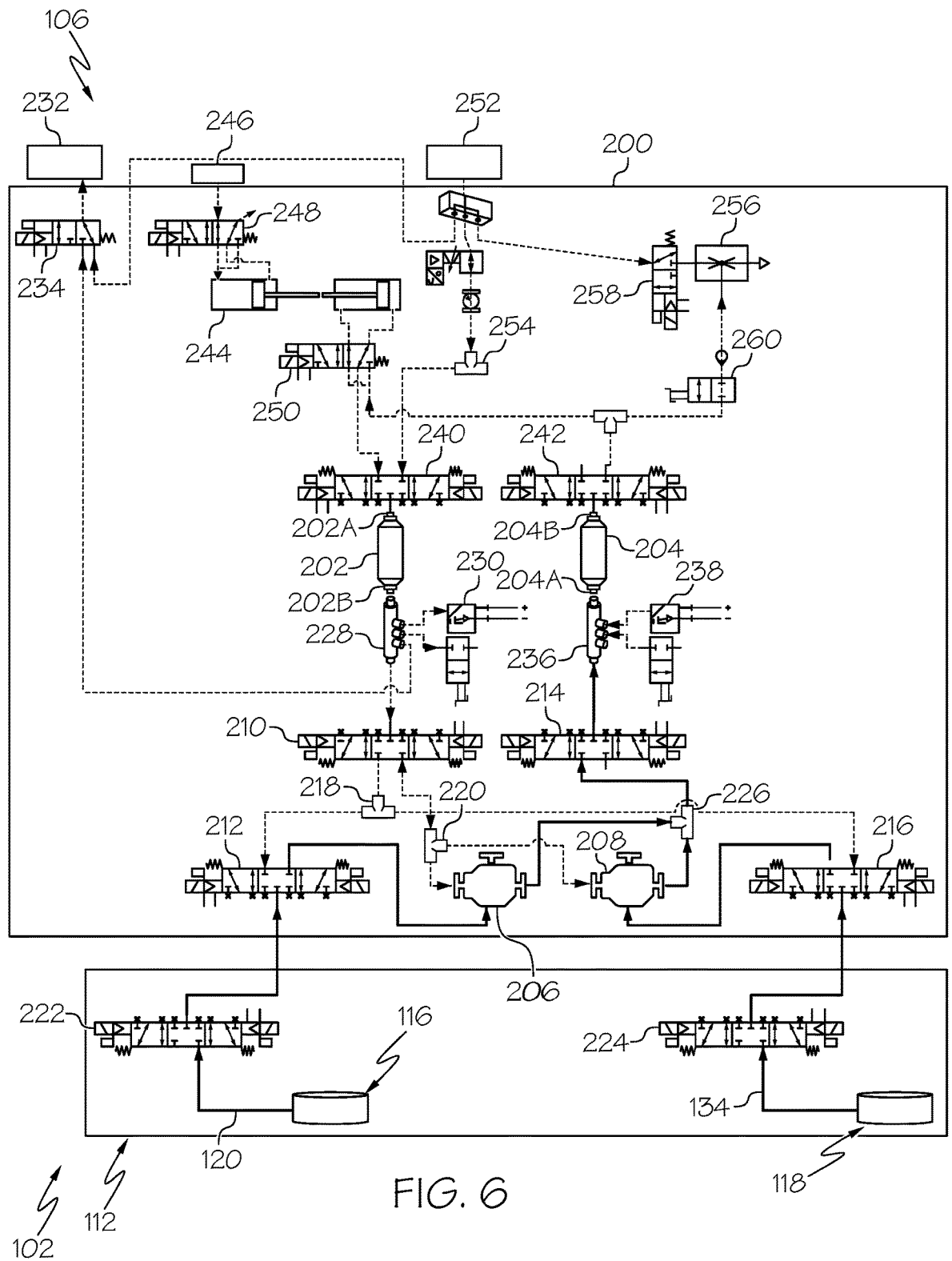
FIG. 6 schematically depicts a flow of gas through the gas control system of FIG. 3 during a negative pressure purge mode, according to one or more embodiments shown and described herein.

Referring now to FIG. 6, a flow of gas during the negative pressure purge mode or vacuum recovery mode of the purging operation is depicted in solid line. After the positive pressure purge mode is completed, such that the positive pressure vessel 202 is depressurized and the gas is delivered to the first manifold 116 and the second manifold 118, the gas control system 106 is operated to perform the negative pressure purge mode, or vacuum recovery mode. As discussed above, during the positive pressure purge mode, the printhead side first manifold valve 222, the printhead side second manifold valve 224, the control side first manifold valve 212, and the control side second manifold valve 216 are each in the open state. However, in the negative pressure purge mode, the control side first manifold valve 212 and the control side second manifold valve 216 are positioned into the second open state such that gas from the first manifold 116 and the second manifold 118 may be directed to the first pressure control valve 206 and the second pressure control valve 208, respectively. The first negative pressure valve 214 is then positioned into the open state such that the vacuum within the negative pressure vessel 204 draws gas out of each of the first manifold 116 and the second manifold 118 and through the first pressure control valve 206 and the second pressure control valve 208. During the negative pressure purge mode, the first pressure control valve 206 and the second pressure control valve 208 may be configured to permit full, unrestricted flow of gas from the first manifold 116 and the second manifold 118 to the negative pressure vessel 204. It should be appreciated that gas does not flow through the first pressure control valve 206 and the second pressure control valve 208 when in the positive pressure purge mode to provide a direct flow of gas to the first manifold 116 and the second manifold 118, and further eliminate the need for additional gas lines connected to the first pressure control valve 206 and the second pressure control valve 208.

It should be appreciated that, during the purging operation, the gas control system 106 may repeatedly alternate between the positive pressure purging state and the negative pressure purging state a predetermined number of times within short intervals of one another to purge the printhead(s) 114.

Figure 7:
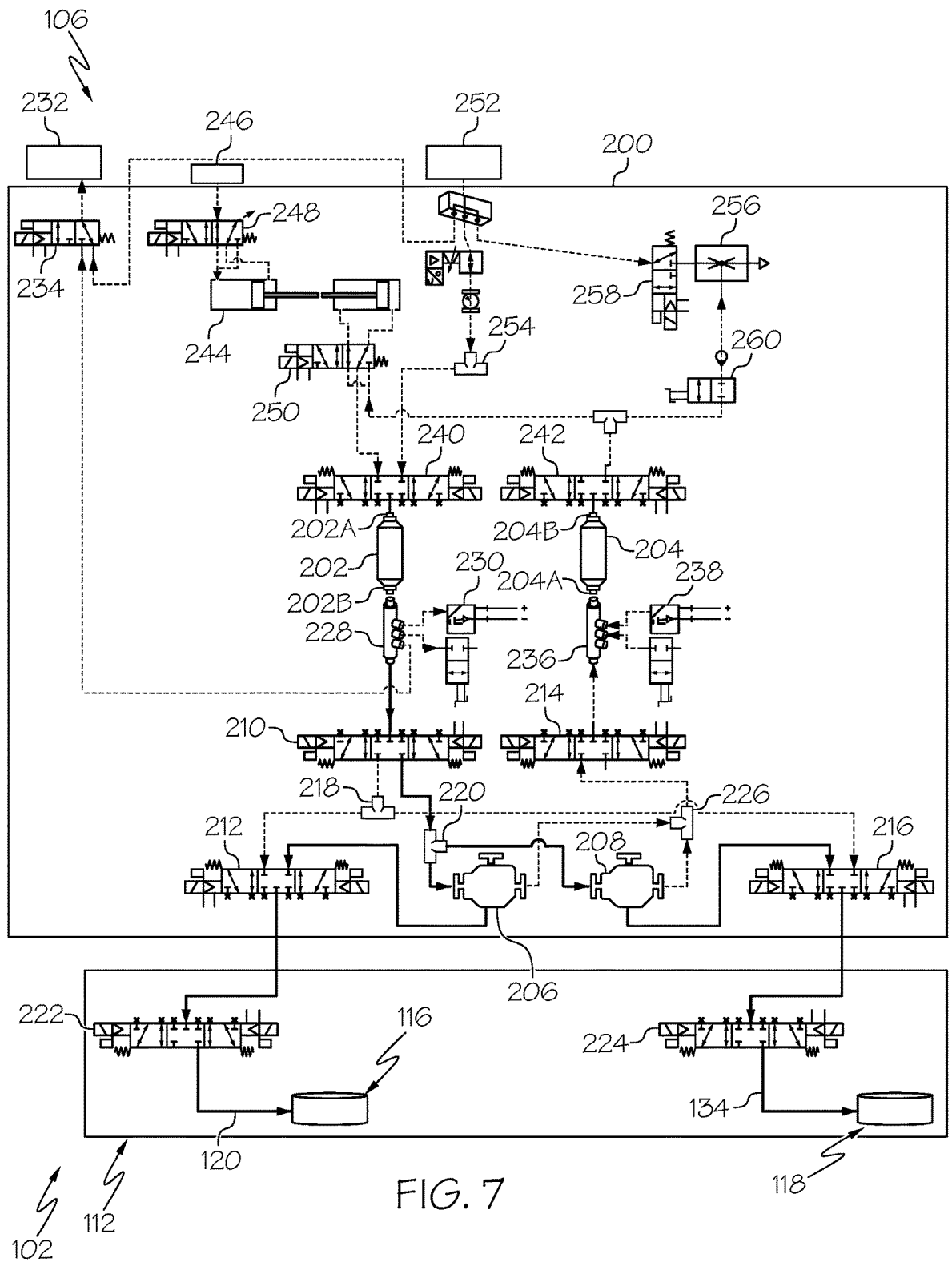
FIG. 7 schematically depicts a flow of gas through the gas control system of FIG. 3 during a normal positive pressure mode, according to one or more embodiments shown and described herein.

Referring now to FIG. 7, a flow of gas during the normal positive pressure mode of a normal operation is depicted. During normal operation of the gas control system 106, gas is provided to the first manifold 116 and the second manifold 118 to maintain a level of binder within the first manifold 116 and the second manifold 118 within a predetermined range. This differs from the positive pressure purge mode in which an increased amount of gas is provided to the first manifold 116 and the second manifold 118 to clear a clog. As noted hereinabove, the level of binder within the first manifold 116 is determined by a first upper float 132A and a first lower float 132B. Similarly, the level of binder within the second manifold 118 is determined by a second upper float 146A and a second lower float 146B. When the level of binder within either the first manifold 116 or the second manifold 118 rises above the predetermined range, the pressure within the corresponding first manifold 116 or the second manifold 118 is increased. For example, if the level of binder within both the first manifold 116 and the second manifold 118 rises above the predetermined range, the pressure within both the first manifold 116 and the second manifold 118 is increased by directing gas from the positive pressure vessel 202 to the first manifold 116 and the second manifold 118. More particularly, in the present example, the first positive pressure valve 210 is positioned into the second open state to allow gas to flow from the positive pressure vessel 202. Thereafter, the gas, i.e., a primary flow of gas, which diverges to form a first flow of gas and a second flow of gas, is directed to both the first pressure control valve 206 and the second pressure control valve 208 through the first positive pressure distributor 218. The first pressure control valve 206 and the second pressure control valve 208 are then operated to control the amount of gas permitted to flow to the first manifold 116 and the second manifold 118, respectively, based on the level of binder detected within each of the first manifold 116 and the second manifold 118. For example, if the level of binder is higher in the first manifold 116 as compared to the level of binder in the second manifold 118, the first pressure control valve 206 may permit a greater amount of gas to flow to the first manifold 116 as compared to the amount of gas permitted to flow to the second manifold 118 by the second pressure control valve 208. During the normal positive pressure mode, the control side first manifold valve 212 and the control side second manifold valve 216 are both positioned into the second open state to permit gas to flow from the first pressure control valve 206 and the second pressure control valve 208. Additionally, the printhead side first manifold valve 222 and the printhead side second manifold valve 224 are both positioned into the open state to permit the gas to enter the first manifold 116 and the second manifold 118, respectively.

Figure 8:
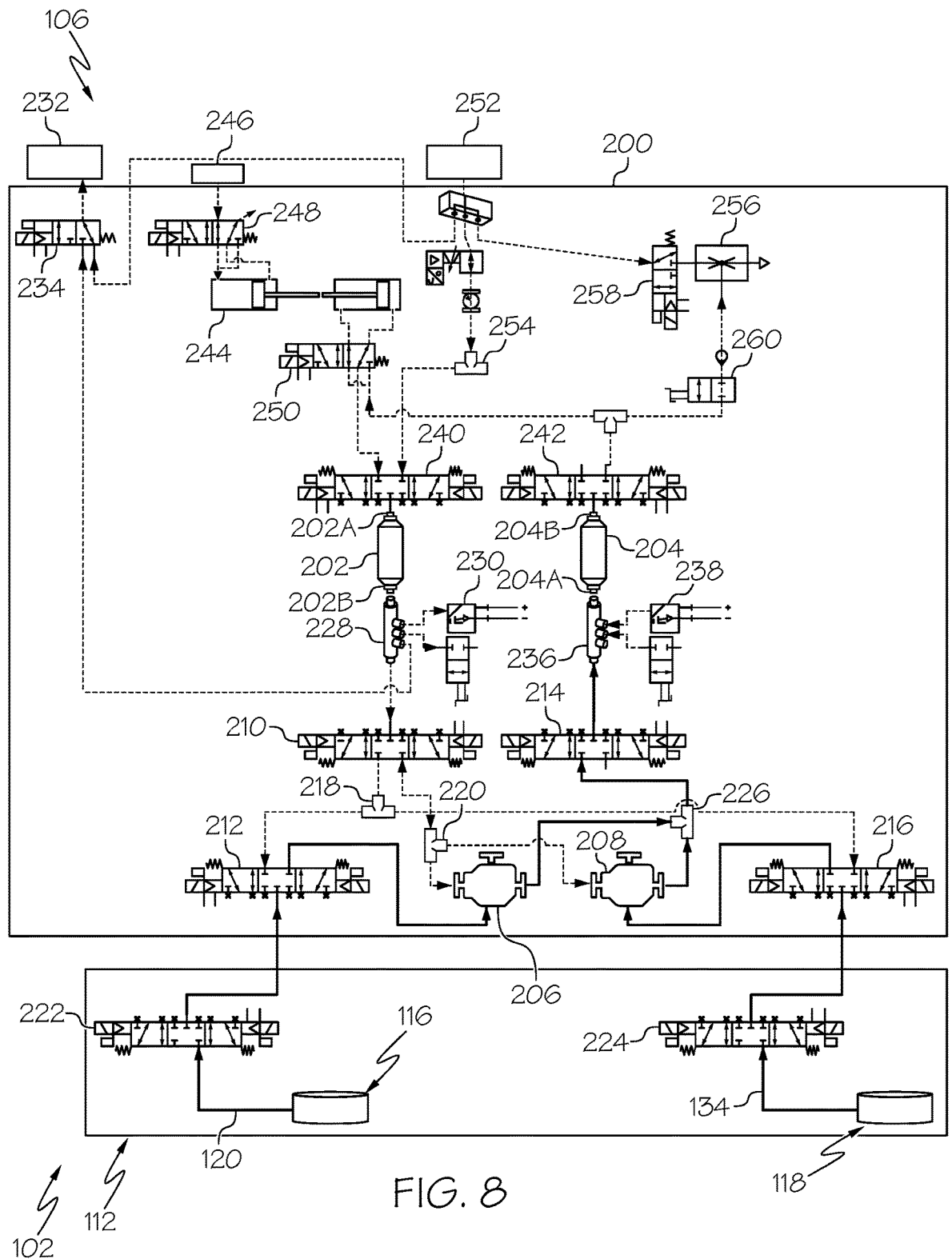
FIG. 8 schematically depicts a flow of gas through the gas control system of FIG. 3 during a normal negative pressure mode, according to one or more embodiments shown and described herein.

Referring now to FIG. 8, a flow of gas during the normal negative pressure mode of the normal operation is depicted. It should be appreciated that the direction of flow of gas during the normal negative pressure mode of the normal operation is the same as the direction of flow of gas during the negative pressure purge mode of the purging operation. During normal operation of the gas control system 106 while in the normal negative pressure mode, gas is drawn the first manifold 116 and the second manifold 118 to maintain the level of binder within the first manifold 116 and the second manifold 118 within the predetermined range. This differs from the negative pressure purge mode in which an increased amount of gas is drawn from the first manifold 116 and the second manifold 118 to clear a clog. In instances in which the level of binder detected in the first manifold 116 or the second manifold 118 is determined to fall below the predetermined range, the pressure in the corresponding first manifold 116 or second manifold 118 must be reduced to permit the level of binder to increase. For example, if the level of binder within both the first manifold 116 and the second manifold 118 falls below the predetermined range, the pressure within both the first manifold 116 and the second manifold 118 is decreased by drawing gas out of the first manifold 116 and the second manifold 118 by the negative pressure vessel 204. During the normal negative pressure mode, the control side first manifold valve 212 and the control side second manifold valve 216 are both positioned in the second open state to permit gas to flow from to the first pressure control valve 206 and the second pressure control valve 208. Additionally, the printhead side first manifold valve 222 and the printhead side second manifold valve 224 are both positioned into the open state to permit the gas to be drawn from the first manifold 116 and the second manifold 118, respectively. More particularly, in the present example, the first negative pressure valve 214 is positioned into the open state to allow gas to flow into the negative pressure vessel 204 caused by the negative pressure or vacuum created within the negative pressure vessel 204. Thereafter, the first pressure control valve 206 and the second pressure control valve 208 are configured to direct the flow of gas from the first manifold 116 and the second manifold 118 to the negative pressure vessel 204 through the negative pressure distributor 226. More particularly, the first pressure control valve 206 and the second pressure control valve 208 are operated to control the amount of gas permitted to be drawn from the first manifold 116 and the second manifold 118 based on the level of binder detected within each of the first manifold 116 and the second manifold 118. For example, if the level of binder is higher in the first manifold 116 as compared to the level of binder in the second manifold 118, the first pressure control valve 206 may permit less gas to be drawn out of the first manifold 116 as compared to the amount of gas permitted to be drawn out of the second manifold 118 by the second pressure control valve 208.

It should be appreciated that the gas control system 106 may alternate between the normal positive pressure mode and the normal negative pressure mode at any point to adjust the pressure within the first manifold 116 and the second manifold 118. In addition, it should be appreciated that, in embodiments, the gas control system 106 may be operated to allow for gas to flow into one of the first manifold 116 or the second manifold 118 from the positive pressure vessel 202 while gas is being drawn from the other of the first manifold 116 or the second manifold 118 by the negative pressure vessel 204.

Figure 9:
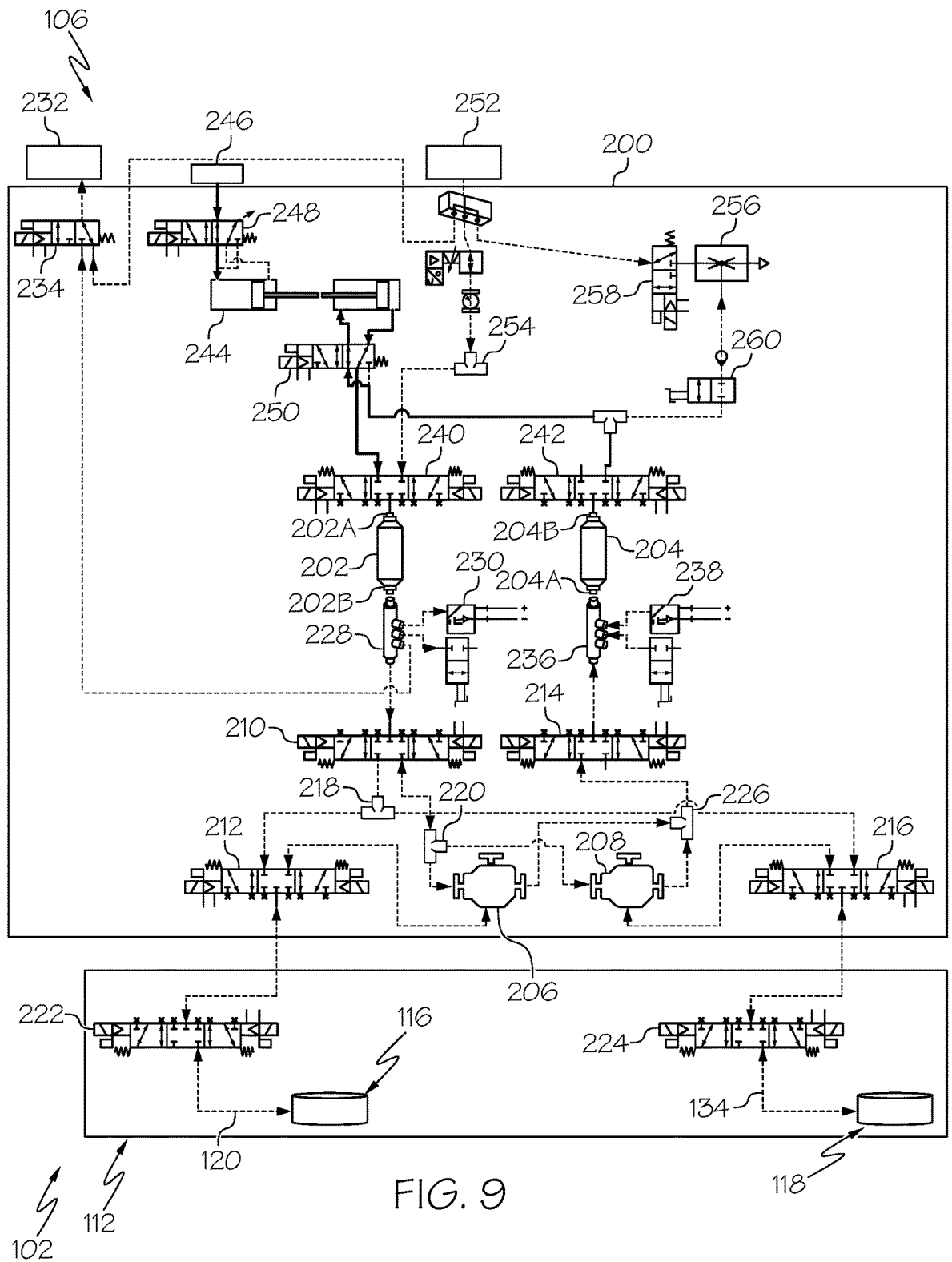
FIG. 9 schematically depicts a flow of gas through the gas control system of FIG. 3 during an embodiment of a calibration mode, according to one or more embodiments shown and described herein.

Referring now to FIG. 9, a flow of gas during an embodiment of the calibration mode is depicted. As discussed herein, after the purging operation is performed, the positive pressure vessel 202 and the negative pressure vessel 204 are depressurized. Specifically, the pressure within the positive pressure vessel 202 and the negative pressure vessel 204 is depleted to 0 psi. As such, prior to preforming another purging operation, the positive pressure vessel 202 and the negative pressure vessel 204 must be pressurized back to their calibrated state such that the positive pressure vessel 202 has a positive pressure and the negative pressure vessel 204 has a negative pressure, or is maintained at a vacuum. In embodiments, during the calibration mode, the gas within the negative pressure vessel 204 may be transferred to the positive pressure vessel 202 to create a vacuum within the negative pressure vessel 204 and positively pressurize the positive pressure vessel 202. More particularly, as described herein, the dual piston assembly 244 may be operated to draw gas out of the negative pressure vessel 204 and direct the gas back into the positive pressure vessel 202. In doing so, the second positive pressure valve 240 and the second negative pressure valve 242 are both positioned into the open state such that gas is permitted to flow therethrough. Additionally, the first piston valve 248 is positioned into the open state to allow air from the compressed air tank 246 to be provided to and actuate the dual piston assembly 244. The second piston valve 250 is also positioned into the open state to permit gas to flow into and out of the dual piston assembly 244. The dual piston assembly 244 is operated until the positive pressure vessel 202 and the negative pressure vessel 204 are pressurized back into their respective calibrated state, which may be detected by the positive pressure sensor 230 and the negative pressure sensor 238, respectively.

Figure 10:
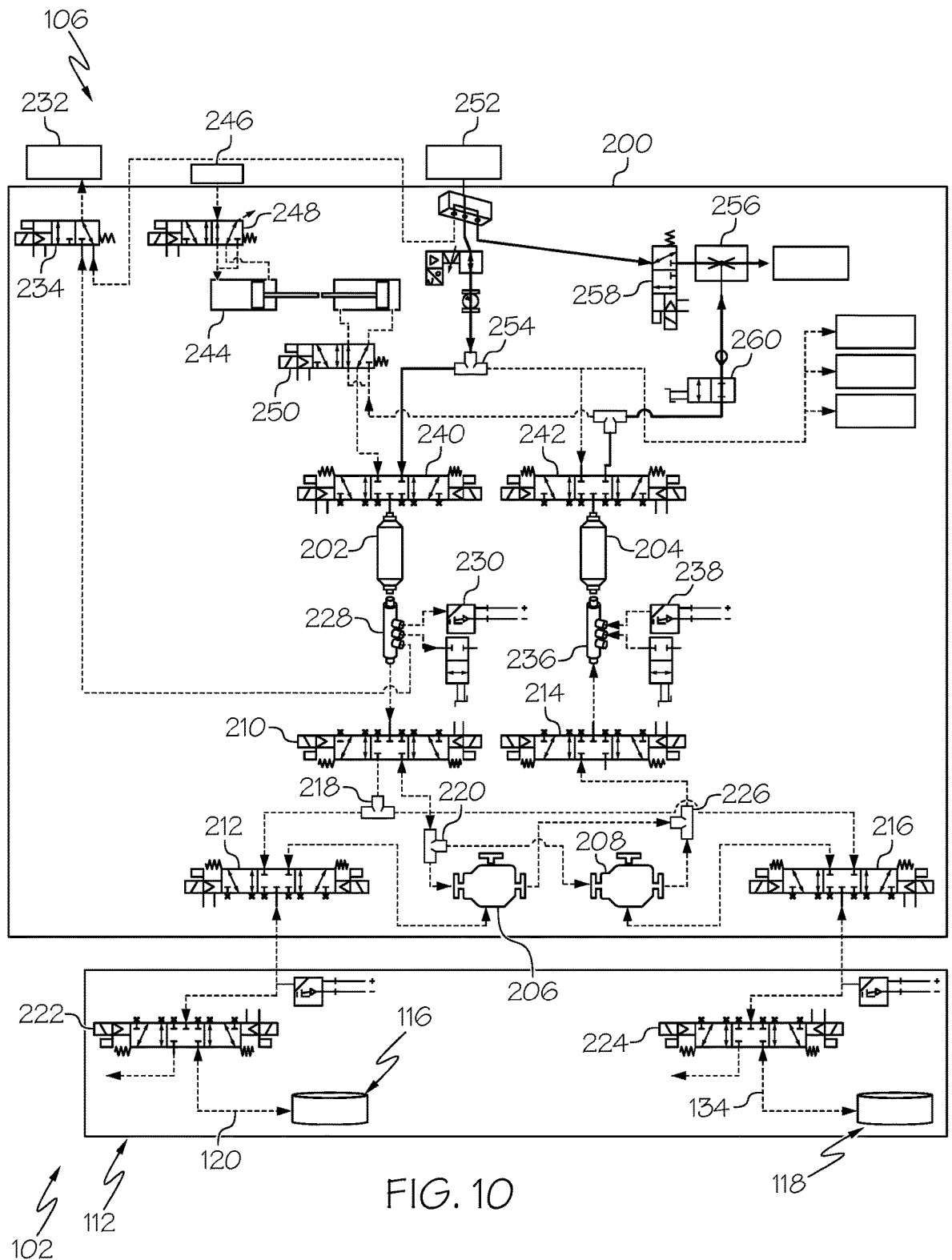
FIG. 10 schematically depicts a flow of gas through the gas control system of FIG. 3 during another embodiment of a calibration mode, according to one or more embodiments shown and described herein.

Referring now to FIG. 10, a flow of gas during another embodiment of the calibration mode is depicted. Rather than transferring gas from the negative pressure vessel 204 to the positive pressure vessel 202, as discussed in the above embodiment of the calibration mode, external gas may be separately provided to the positive pressure vessel 202 and used to draw gas out of the negative pressure vessel 204. Specifically, the second positive pressure valve 240 may be positioned into the open state and the external gas supply 252 may be operated to deliver gas through the external gas supply distributor 254 and into the positive pressure vessel 202. It should be appreciated that, in the present embodiment, the external gas supply distributor 254 is configured to direct the flow of gas to only the positive pressure vessel 202 and not the negative pressure vessel 204. Alternatively, the second negative pressure valve 242 may be configured to not receive gas from the external gas supply distributor 254. In embodiments, the positive pressure sensor 230 may detect when the positive pressure vessel 202 is positioned back into the calibrated state and, in response, the second positive pressure valve 240 may be positioned into the closed state to prevent additional gas from entering the positive pressure vessel 202. Additionally, the external gas supply 252 may be operated to direct a flow of gas to the Venturi device 256 when the first Venturi valve 258 is in the open state. Thereafter, the second negative pressure valve 242 and the second Venturi valve 260 are positioned into the open state such that the flow of gas through the Venturi device 256 draws gas out of the negative pressure vessel 204. In embodiments, the negative pressure sensor 238 may detect when the negative pressure vessel 204 is positioned back into the calibrated state and, in response, the second negative pressure valve 242 may be positioned into the closed state to prevent additional gas from being drawn out of the negative pressure vessel 204. Thereafter, the external gas supply 252 may be deactivated.

Figure 11:
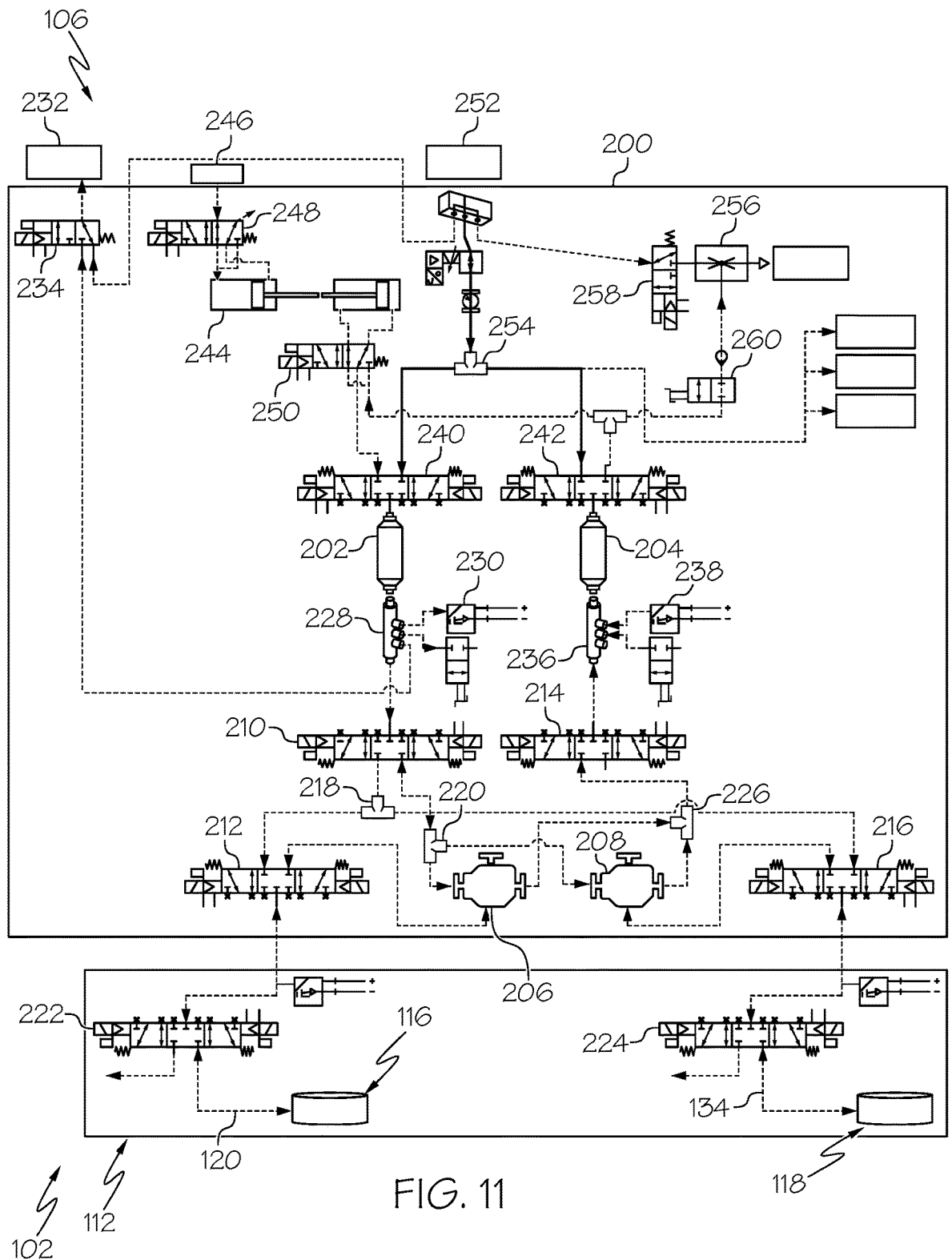
FIG. 11 schematically depicts a flow of gas through the gas control system of FIG. 3 during a cleaning mode, according to one or more embodiments shown and described herein.

Referring now to FIG. 11, a flow of gas during the cleaning mode is depicted. In embodiments, it may be necessary to supply gas to both the positive pressure vessel 202 and the negative pressure vessel 204 to ensure that there are no leaks within the gas control system 106 or to inert the entire gas control system 106. As such, the external gas supply 252 is operated to provide gas to both the positive pressure vessel 202 and the negative pressure vessel 204. More particularly, the external gas supply distributor 254 is configured to direct the flow of gas to both the positive pressure vessel 202 and the negative pressure vessel 204. Additionally, the second positive pressure valve 240 and the second negative pressure valve 242 are both positioned into the open position to allow the gas from the external gas supply 252 to enter the positive pressure vessel 202 and the negative pressure vessel 204. After the cleaning mode is completed, the external gas supply 252 may be deactivated.

From the above, it is to be appreciated that defined herein is a manufacturing apparatus including a printhead assembly including a first manifold, a second manifold, and one or more printheads, a binder control system, a gas control system, a power source, and a binder tank. The power source provides power to the binder control system, the gas control system, and the printhead assembly. The binder control system controls the flow of binder from the binder tank to each of the first manifold and the second manifold. The gas control system controls a flow of gas from an external gas supply to each of the first manifold and the second manifold. During a purging operation, gas may be rapidly circulated between the gas control system and the manifolds to purge a clogged nozzle of the one or more printheads.

This provides a number of benefits such as, for example, improved safety, printhead stability, robustness, and controllability, and reduced costs and response time by rapidly pressurizing and purging. More particularly, the positive pressure vessel and the negative pressure vessel supply the printheads with the required gas pressure necessary for back purging and vacuum-based meniscus control of the fluid. This also allows for ultra-precise printhead gas pressure control achieved by the first pressure control valve and the second pressure control valve. The piston assembly permits gas to flow to the positive pressure vessel within a fully closed gas circuit.

Further aspects of the embodiments described herein are provided by the subject matter of the following clauses:

Clause 1. A gas control system comprising: a positive pressure vessel; a negative pressure vessel; a first pressure control valve configured to control a first flow of gas to and from a first manifold of a printhead assembly; and a second pressure control valve configured to control a second flow of gas to and from a second manifold of the printhead assembly, wherein during a normal positive pressure mode, a primary flow of gas forming the first flow of gas and the second flow of gas flows from the positive pressure vessel to the first manifold and the second manifold through a respective one of the first pressure control valve and the second pressure control valve, wherein during a positive pressure purge mode, the first flow of gas and the second flow of gas from the positive pressure vessel bypasses the first pressure control valve and the second pressure control valve to flow to the first manifold and the second manifold.

Clause 2. The gas control system of clause 1, wherein: during a negative pressure purge mode and a normal negative pressure mode, the first flow of gas and the second flow of gas is drawn from the first manifold and the second manifold to the negative pressure vessel through a respective one of the first pressure control valve and the second pressure control valve.

Clause 3. The gas control system of clause 1 or clause 2, wherein: the positive pressure vessel is calibrated to a positive pressure greater than or equal to 10 psi and less than or equal to 20 psi; and the negative pressure vessel is calibrated to a negative pressure less than or equal to −10 psi and greater than or equal to −15 psi.

Clause 4. The gas control system of any one of clauses 1-3, further comprising: a first positive pressure valve positionable between a first open state, a second open state, and a closed state; and a control side first manifold valve positionable between a first open state, a second open state, and a closed state to direct the primary flow of gas toward the first manifold, wherein when the first positive pressure valve is in the first open state, the primary flow of gas from the positive pressure vessel is directed to the control side first manifold valve, wherein when the first positive pressure valve is in the second open state, the primary flow of gas from the positive pressure vessel is directed to the first pressure control valve and the second pressure control valve.

Clause 5. The gas control system of any one of clauses 1-4, further comprising: a first negative pressure valve positionable between an open state and a closed state, wherein when the first negative pressure valve is in the open state, a secondary flow of gas is permitted to be drawn into the negative pressure vessel from the first pressure control valve and the second pressure control valve.

Clause 6. The gas control system of any one of clauses 1-5, further comprising: a control side second manifold valve positionable between a first open state, a second open state, and a closed state, wherein when the control side second manifold valve is in the first open state, the primary flow of gas from the positive pressure vessel is permitted to flow through the control side second manifold valve and to the second manifold, wherein when the control side second manifold valve is in the second open state, a secondary flow of gas is permitted to flow between the second manifold and the second pressure control valve.

Clause 7. The gas control system of any one of clauses 1-6, further comprising: a positive pressure sensor configured to detect a pressure within the positive pressure vessel; a negative pressure sensor configured to detect a pressure within the negative pressure vessel; and an electronic control unit configured to receive data from the positive pressure sensor and the negative pressure sensor.

Clause 8. The gas control system of any one of clauses 1-7, further comprising: a dual piston assembly configured to draw gas out of the negative pressure vessel and direct the gas back into the positive pressure vessel to establish a negative pressure in the negative pressure vessel and a positive pressure in the positive pressure vessel.

Clause 9. The gas control system of any one of clauses 1-8, further comprising: an external gas supply in direct fluid communication with the positive pressure vessel; and a Venturi device in fluid communication with the external gas supply, wherein, during a calibration mode, the external gas supply directs gas from the external gas supply into the positive pressure vessel to establish a positive pressure in the positive pressure vessel, wherein, during the calibration mode, the external gas supply directs gas from the external gas supply into the Venturi device, the Venturi device configured to draw gas out of the negative pressure vessel to establish a negative pressure in the negative pressure vessel.

Clause 10. A manufacturing apparatus comprising: a printhead assembly including a first manifold, a second manifold, and a printhead, the first manifold and the second manifold directing a first flow of binder to and from the printhead, the first manifold and the second manifold each including a float for detecting a level of binder in a respective one of the first manifold and the second manifold; a binder control system for controlling a second flow of binder to the first manifold and the second manifold; and the gas control system of claim 1.

Clause 11. The manufacturing apparatus of clause 10, wherein during a normal negative pressure mode and in response to the float detecting a level of binder falling below a predetermined threshold, the negative pressure vessel draws gas out of the first manifold and the second manifold and through a respective one of the first pressure control valve and the second pressure control valve.

Clause 12. The manufacturing apparatus of clause 10 or clause 11, wherein the float of each of the first manifold and the second manifold comprises: an upper float configured to detect when the level of binder within a respective one of the first manifold and the second manifold rises above an upper predetermined threshold; and a lower float configured to detect when the level of binder within a respective one of the first manifold and the second manifold falls below above a lower predetermined threshold.

Clause 13. The manufacturing apparatus of any one of clauses 10-12, wherein: during a negative pressure purge mode and a normal negative pressure mode, gas is drawn from the first manifold and the second manifold to the negative pressure vessel through a respective one of the first pressure control valve and the second pressure control valve.

Clause 14. The manufacturing apparatus of any one of clauses 10-13, wherein: the positive pressure vessel is calibrated to a positive pressure to deliver gas to the first manifold and the second manifold; and the negative pressure vessel is calibrated to a negative pressure to draw gas out of the first manifold and the second manifold.

Clause 15. The manufacturing apparatus of any one of clauses 10-14, further comprising: a dual piston assembly configured to draw gas out of the negative pressure vessel and direct the gas back into the positive pressure vessel to establish a negative pressure in the negative pressure vessel and a positive pressure in the positive pressure vessel during a calibration mode.

Clause 16. The manufacturing apparatus of any one of clauses 10-15, further comprising: an external gas supply in direct fluid communication with the positive pressure vessel; and a Venturi device in fluid communication with the external gas supply, wherein, during a calibration mode, the external gas supply directs gas into the positive pressure vessel to establish a positive pressure in the positive pressure vessel, wherein, during the calibration mode, the external gas supply directs gas into the Venturi device, the Venturi device configured to draw gas out of the negative pressure vessel to establish a negative pressure in the negative pressure vessel.

Clause 17. A method comprising: pressurizing a positive pressure vessel of a gas control system to a positive pressure; pressurizing a negative pressure vessel of the gas control system to a negative pressure to create a vacuum within the negative pressure vessel; moving gas between the positive pressure vessel and the negative pressure vessel to achieve a fully closed gas circuit; operating the gas control system to perform a normal operation to maintain a level of binder within a first manifold and a second manifold, the normal operation includes a normal positive pressure normal mode in which gas from the positive pressure vessel is directed to a first manifold through a first pressure control valve, and gas from the positive pressure vessel is directed to a second manifold through a second pressure control valve; and operating the gas control system to perform a purging operation to de-clog a nozzle of a printhead, the purging operation including a positive pressure purge mode in which gas from the positive pressure vessel is permitted to flow to the first manifold and the second manifold while bypassing the first pressure control valve and the second pressure control valve.

Clause 18. The method of clause 17, further comprising: drawing gas from the first manifold and the second manifold to the negative pressure vessel through a respective one of the first pressure control valve and the second pressure control valve during a negative pressure purge mode of the purging operation and a normal negative pressure mode of the normal operation, wherein the gas is an inert gas and the binder in the first manifold and the second manifold is a solvent-based binder.

Clause 19. The method of clause 17 or clause 18, further comprising: calibrating the positive pressure vessel to a positive pressure prior to the purging operation and the normal operation to permit gas to be delivered to the first manifold and the second manifold; and calibrating the negative pressure vessel to a negative pressure prior to the purging operation and the normal operation to permit gas to be drawn out of the first manifold and the second manifold.

Clause 20. The method of any one of clauses 17-19, further comprising: actuating a dual piston assembly to draw gas out of the negative pressure vessel and direct the gas back into the positive pressure vessel to establish a negative pressure in the negative pressure vessel and a positive pressure in the positive pressure vessel during a calibration mode. While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A gas control system comprising:
a positive pressure vessel;
a negative pressure vessel;
a first pressure control valve configured to control a first flow of gas to and from a first manifold of a printhead assembly; and
a second pressure control valve configured to control a second flow of gas to and from a second manifold of the printhead assembly,
wherein during a normal positive pressure mode, a primary flow of gas forming the first flow of gas and the second flow of gas flows from the positive pressure vessel to the first manifold and the second manifold through a respective one of the first pressure control valve and the second pressure control valve,
wherein during a positive pressure purge mode, the first flow of gas and the second flow of gas from the positive pressure vessel bypasses the first pressure control valve and the second pressure control valve to flow to the first manifold and the second manifold.

2. The gas control system of claim 1, wherein:
during a negative pressure purge mode and a normal negative pressure mode, the first flow of gas and the second flow of gas is drawn from the first manifold and the second manifold to the negative pressure vessel through a respective one of the first pressure control valve and the second pressure control valve.

3. The gas control system of claim 1, wherein:
the positive pressure vessel is calibrated to a positive pressure greater than or equal to 10 psi and less than or equal to 20 psi; and
the negative pressure vessel is calibrated to a negative pressure less than or equal to -10 psi and greater than or equal to -15 psi.

4. The gas control system of claim 1, further comprising:
a first positive pressure valve positionable between a first open state, a second open state, and a closed state; and
a control side first manifold valve positionable between a first open state, a second open state, and a closed state to direct the primary flow of gas toward the first manifold,
wherein when the first positive pressure valve is in the first open state, the primary flow of gas from the positive pressure vessel is directed to the control side first manifold valve,
wherein when the first positive pressure valve is in the second open state, the primary flow of gas from the positive pressure vessel is directed to the first pressure control valve and the second pressure control valve.

5. The gas control system of claim 1, further comprising:
a first negative pressure valve positionable between an open state and a closed state,
wherein when the first negative pressure valve is in the open state, a secondary flow of gas is permitted to be drawn into the negative pressure vessel from the first pressure control valve and the second pressure control valve.

6. The gas control system of claim 1, further comprising:
a control side second manifold valve positionable between a first open state, a second open state, and a closed state,
wherein when the control side second manifold valve is in the first open state, the primary flow of gas from the positive pressure vessel is permitted to flow through the control side second manifold valve and to the second manifold,
wherein when the control side second manifold valve is in the second open state, a secondary flow of gas is permitted to flow between the second manifold and the second pressure control valve.

7. The gas control system of claim 1, further comprising:
a positive pressure sensor configured to detect a pressure within the positive pressure vessel;
a negative pressure sensor configured to detect a pressure within the negative pressure vessel; and
an electronic control unit configured to receive data from the positive pressure sensor and the negative pressure sensor.

8. The gas control system of claim 1, further comprising:
a dual piston assembly configured to draw gas out of the negative pressure vessel and direct the gas back into the positive pressure vessel to establish a negative pressure in the negative pressure vessel and a positive pressure in the positive pressure vessel.

9. The gas control system of claim 1, further comprising:
an external gas supply in direct fluid communication with the positive pressure vessel; and
a Venturi device in fluid communication with the external gas supply,
wherein, during a calibration mode, the external gas supply directs gas from the external gas supply into the positive pressure vessel to establish a positive pressure in the positive pressure vessel,
wherein, during the calibration mode, the external gas supply directs gas from the external gas supply into the Venturi device, the Venturi device configured to draw gas out of the negative pressure vessel to establish a negative pressure in the negative pressure vessel.

10. A manufacturing apparatus, comprising:
a printhead assembly including a first manifold, a second manifold, and a printhead, the first manifold and the second manifold directing a first flow of binder to and from the printhead, the first manifold and the second manifold each including a float for detecting a level of binder in a respective one of the first manifold and the second manifold; and
the gas control system of claim 1.

11. The manufacturing apparatus of claim 10, wherein during a normal negative pressure mode and in response to the float detecting a level of binder falling below a predetermined threshold, the negative pressure vessel draws gas out of the first manifold and the second manifold and through a respective one of the first pressure control valve and the second pressure control valve.

12. The manufacturing apparatus of claim 10, wherein the float of each of the first manifold and the second manifold comprises:
an upper float configured to detect when the level of binder within a respective one of the first manifold and the second manifold rises above an upper predetermined threshold; and
a lower float configured to detect when the level of binder within a respective one of the first manifold and the second manifold falls below a lower predetermined threshold.

13. The manufacturing apparatus of claim 10, wherein:
during a negative pressure purge mode and a normal negative pressure mode, gas is drawn from the first manifold and the second manifold to the negative pressure vessel through a respective one of the first pressure control valve and the second pressure control valve.

14. The manufacturing apparatus of claim 10, wherein:
the positive pressure vessel is calibrated to a positive pressure greater than or equal to 10 psi and less than or equal to 20 psi; and
the negative pressure vessel is calibrated to a negative pressure less than or equal to −10 psi and greater than or equal to −15 psi.

15. The manufacturing apparatus of claim 10, further comprising:
a dual piston assembly configured to draw gas out of the negative pressure vessel and direct the gas back into the positive pressure vessel to establish a negative pressure in the negative pressure vessel and a positive pressure in the positive pressure vessel during a calibration mode.

16. The manufacturing apparatus of claim 10, further comprising:
an external gas supply in direct fluid communication with the positive pressure vessel; and
a Venturi device in fluid communication with the external gas supply,
wherein, during a calibration mode, the external gas supply directs gas into the positive pressure vessel to establish a positive pressure in the positive pressure vessel,
wherein, during the calibration mode, the external gas supply directs gas into the Venturi device, the Venturi device configured to draw gas out of the negative pressure vessel to establish a negative pressure in the negative pressure vessel.

17. A method comprising:
pressurizing a positive pressure vessel of a gas control system to a positive pressure;
pressurizing a negative pressure vessel of the gas control system to a negative pressure to create a vacuum within the negative pressure vessel;
moving gas between the positive pressure vessel and the negative pressure vessel to achieve a fully closed gas circuit;
operating the gas control system to perform a normal operation to maintain a level of binder within a first manifold and a second manifold, the normal operation includes a normal positive pressure normal mode in which gas from the positive pressure vessel is directed to a first manifold through a first pressure control valve, and gas from the positive pressure vessel is directed to a second manifold through a second pressure control valve; and
operating the gas control system to perform a purging operation to de-clog a nozzle of a printhead, the purging operation including a positive pressure purge mode in which gas from the positive pressure vessel is permitted to flow to the first manifold and the second manifold while bypassing the first pressure control valve and the second pressure control valve.

18. The method of claim 17, further comprising:
drawing gas from the first manifold and the second manifold to the negative pressure vessel through a respective one of the first pressure control valve and the second pressure control valve during a negative pressure purge mode of the purging operation and a normal negative pressure mode of the normal operation, wherein the gas is an inert gas and the binder in the first manifold and the second manifold is a solvent-based binder.

19. The method of claim 17, further comprising:

calibrating the positive pressure vessel to a positive pressure prior to the purging operation and the normal operation to permit gas to be delivered to the first manifold and the second manifold; and calibrating the negative pressure vessel to a negative pressure prior to the purging operation and the normal operation to permit gas to be drawn out of the first manifold and the second manifold.

20. The method of claim 17, further comprising:

actuating a dual piston assembly to draw gas out of the negative pressure vessel and direct the gas back into the positive pressure vessel to establish a negative pressure in the negative pressure vessel and a positive pressure in the positive pressure vessel during a calibration mode.

\* \* \* \* \*